United States Patent [19]

Strickland

[11] 4,055,875
[45] Nov. 1, 1977

[54] CABLE GRIPPING DEVICE

[75] Inventor: Frederick W. Strickland, Titusville, Fla.

[73] Assignee: General Dynamics Corporation, San Diego, Calif.

[21] Appl. No.: 689,715

[22] Filed: May 24, 1976

[51] Int. Cl.² .............................................. F16G 11/01
[52] U.S. Cl. .................................. 24/115 R; 403/29; 24/115 N
[58] Field of Search ............. 24/115 N, 115 R, 131 C; 403/291

[56] References Cited

U.S. PATENT DOCUMENTS

| 2,691,478 | 10/1954 | Frankel | 24/115 R |
| 3,343,231 | 9/1967 | Clay | 24/115 N |

FOREIGN PATENT DOCUMENTS

| 538,755 | 3/1957 | Canada | 403/291 |
| 1,215,909 | 11/1958 | France | 403/291 |
| 602,547 | 5/1935 | Germany | 24/115 N |

Primary Examiner—Paul R. Gilliam
Assistant Examiner—K. Dorner
Attorney, Agent, or Firm—John R. Duncan

[57] ABSTRACT

A cable gripping device which is readily adjustable and fail-safe. The device includes cylindrical inner and outer housings in telescoped relationship which contain an inner gripper member and an outer compression spring connected to the housings. When the housings are biased apart by the compression spring, the gripper member is forced into tight contact with a rope or cable passing axially through the housings, locking the assembly in position on the cable. If the housings are moved toward each other, the compression spring is compressed and the gripper member is loosened, allowing the assembly to be moved along the cable. If the operator releases the housings, such as by slipping and falling, the compression spring automatically moves the housings apart, causing the gripper to again grip the cable. This device is especially suitable for use by workers in high locations, since they can move about along a safety cable without unhooking their safety lanyards from the cable.

3 Claims, 5 Drawing Figures

CABLE GRIPPING DEVICE

BACKGROUND OF THE INVENTION

This invention relates in general to cable gripping devices and, more specifically, to an adjustable safety device for connecting a personal safety lanyard to a cable.

A wide variety of devices have been developed which permit a cable, rope or rod-like member to be gripped at a selected point along its length to position a structure attached to the gripping device to be positively positioned at the selected location. While many of these are acceptable for their intended uses, they do not possess the degree of safety, reliability and "fail-safe" characteristics when used in a personal safety system protecting workers in high, exposed locations, workers in extra-vehicular excursions in outer space, etc.

One type of known gripper uses a plurality of wires coiled around the cable to be gripped in an interlaced mesh-like tube, where the tube contracts radially into a gripping relationship with a cable lying along the tube axis when the ends of the mesh tube are moved apart. Typical of such arrangements are those shown by Clay in U.S. Pat. No. 3,343,231 and by DiPalma in U.S. Pat. No. 2,698,150. While these provide a secure grip when actuated, they all have two latched positions; engaged and disengaged. Thus, it is possible to inadvertently disengage, or not properly engage, the gripping device, which would permit the device to slip along the cable possibly resulting in a fall and injury to a worker relying on the device.

In some cases, external springs have been used to increase the force moving the ends of the mesh tube apart to increase the gripping force. While this insures the gripping strength, it does not prevent accidents when the spring is disengaged.

Thus, there is a continuing need for improved cable gripping devices.

OBJECTS OF THE INVENTION

An object, therefore, of this invention is to provide a cable gripping device overcoming the above noted problems.

Another object of this invention is to provide a cable gripping device of improved simplicity and reliability.

Another object of this invention is to provide a cable gripping device having "fail-safe" capability.

SUMMARY OF THE INVENTION

The above objects, and others, are accomplished in accordance with this invention by a cable gripping device comprising first and second cylindrical housings arranged in a telescoping relationship, each of the housings having a partially closed outer end having an axial opening through which a cable or rope may be passed. Within the housings and secured to the inner surfaces of the partially closed ends of the housings is a gripper member adapted to tighten around a cable extending through the housings when the housings are moved apart and to loosen when the housings are moved together. The gripper comprises at least one coiled wire or strand. Preferably, two or more wires, some with a right-hand coil and some with a left-hand coil are used. The coils may be interwoven in the manner of a "Chinese finger trap". To provide a contact force biasing the housings apart, a compression spring is included within the housings.

BRIEF DESCRIPTION OF THE DRAWINGS

Details of the invention, and of a preferred embodiment thereof, will be further understood upon reference to the drawing, wherein.

DETAILED DESCRIPTION OF THE INVENTION

Figure 1:
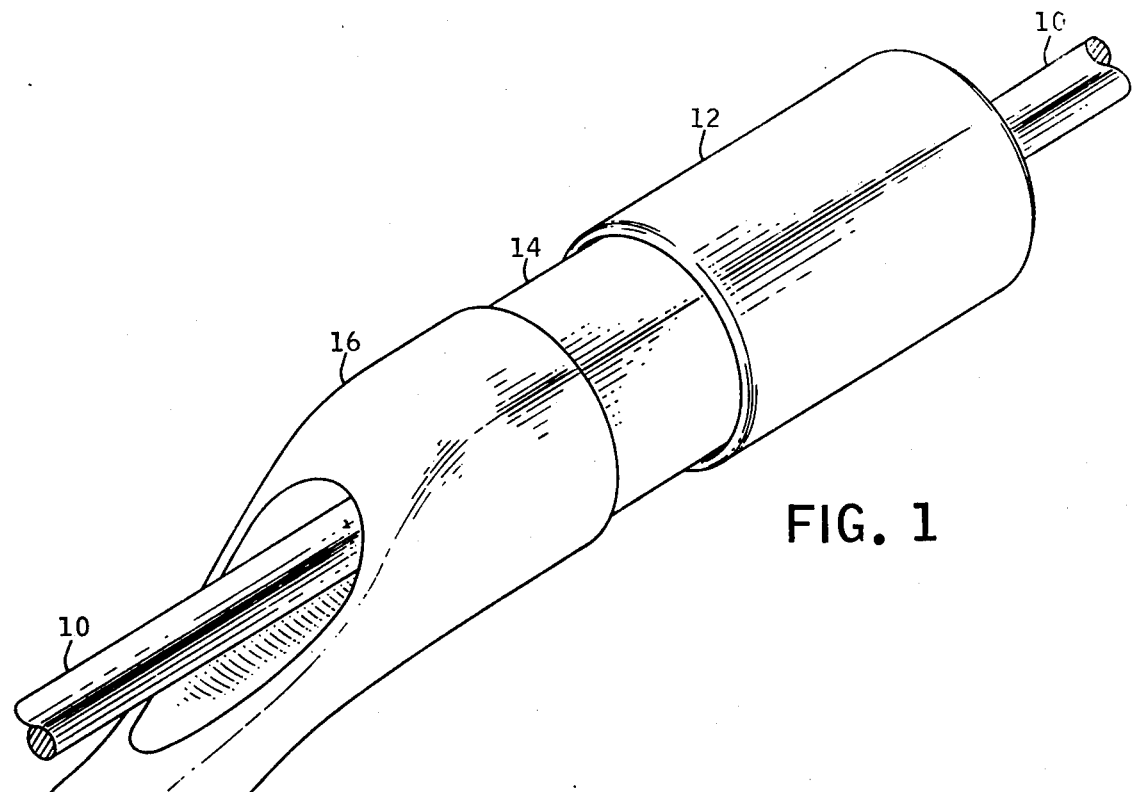
FIG. 1 is a perspective view showing the cable gripping device.

Referring now to FIG. 1, there is seen a cable gripping device suitable for connecting a personal safety lanyard to a cable 10. Cable 10 may, typically, be a wire or hemp rope, a rod or stanchion, or any other elongated member along which a worker may move in performing work at a high or otherwise dangerous location. The cable gripping device comprises a first cylindrical housing 12 having a position of a second cylindrical housing 14 extending thereinto in a telescoping manner. An extension 16 of second housing 14 includes an eye 18 to which a personal safety lanyard or other device can be attached.

Figure 2:
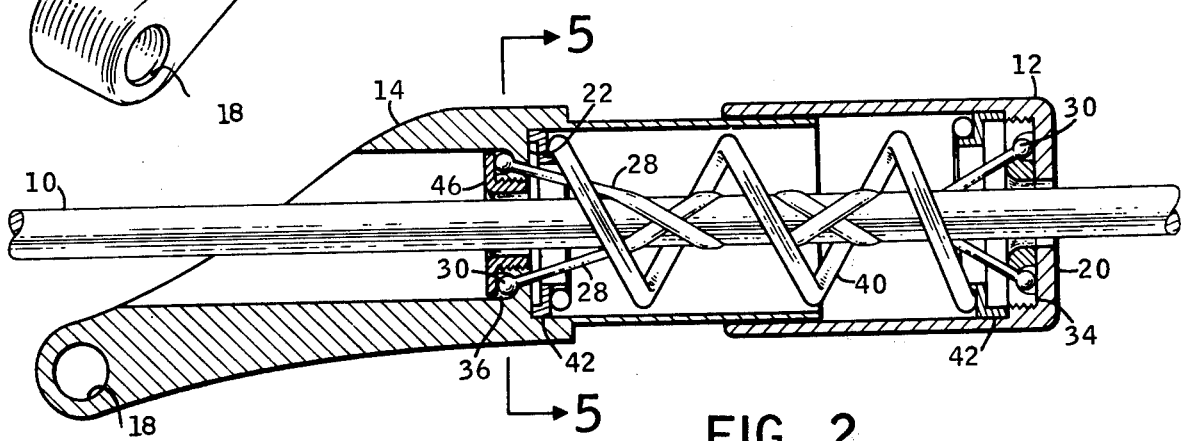
FIG. 2 an elevation view of the gripping device with the housing in section to illustrate the internal structure.

As seen in FIG. 2, first and second housings 12 and 14 have outer ends which are partially closed by walls 20 and 22, respectively. Walls 20 and 22 have axial openings 24 and 26, respectively through which cable 10 passes. If desired, a flexible sealing means may close the openings 24 and 26 in sliding contact with cable 10 to prevent dirt, water, or other contamination from freely entering the housings. Alternatively, openings 24 and 26 may be relatively large so as to permit cables of various diameters to be used with the gripping device.

Figure 3:
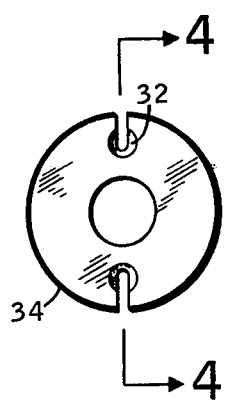
FIG. 3 is a plan view of the upper gripping member retaining ring.
Figure 4:
FIG. 4 is a section view taken on line 4—4 in FIG. 3.
Figure 5:
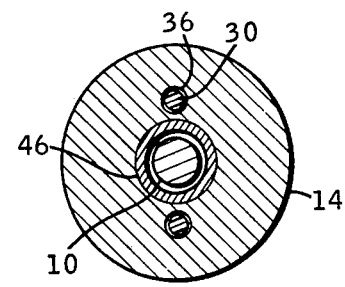
FIG. 5 is a section view taken on line 5—5 in FIG. 2.

A gripper member 28 extends between the two housings. Gripper member 28 is made up of one or more wires, strips or strands extending in a coiled manner around cable 10. Gripper member 28 may use strands formed from metal, glass fiber reinforced plastics such as nylon, etc. For clarity of illustration, a gripper member 28 made up of two coiled strands, one right-hand and one left-hand is shown. Preferably, four or more coiled strands are used, each wrapping around cable 10 at least twice. The strands may be interwoven in the manner of a "Chinese finger trap". The ends of each strand are secured to housings 12 and 14 by any suitable means, such as the engaged spherical ends 30 shown. Ends 30 are trapped in spherical recesses 32 in retainer ring 34 within housing 12 and spherical recesses 36 within housing 14. The arrangement of recesses within these retainer means are further illustrated in FIGS. 3, 4 and 5.

If desired, a single coiled strand may be used for gripper member 28, or more than one all coiled in the same direction. In these cases, the coils will tend to rotate housing 12 relative to housing 14. To prevent such rotation, a spline (not shown) may be provided between the telescoping surfaces of housings 12 and 14, parallel to cable 10, to prevent relative rotation between the housings.

In order to bias housings 12 and 14 apart, to cause gripper member 28 to tightly grip cable 10, a compression spring 40 is provided within the housings. The ends of spring 40 bear against circular bushings 42 within housings 12 and 14. A retainer 46 holds spherical ends 30 in recesses 36.

The cable gripping device is assembled from its several component parts by first slipping the spherical ends 30 at one end of the strands into recesses 32 of retainer 34, which is then threaded into first housing 12. A bushing 42 is inserted into housing 12 and one end of spring 40 is slid into place. Second housing 14 is then inserted into first housing 12 after the second bushing 42 is inserted into second housing 14. Housings 12 and 14 are telescoped together, compressing spring 40, until the lower ends of gripper 28 protrude through the opening in wall 22. The spherical strand ends 30 are fitted into recesses 36 and the housings are allowed to move apart under the urging of spring 40, holding the gripper ends in place by tension. Retainer 46 is then threaded into place to lock spherical ends 30 in recesses 36. Cable 10 can be inserted through the housings and gripper before or after assembly. Cable 10 is most easily inserted after assembly where gripper 28 is made up of a number of right-and left-hand coiled strands in an interwoven relationship. Housings 12 and 14 are moved toward each other, compressing spring 14 and causing the tubular arrangement of coiled strands making up gripper member 28 to shorten and expand in diameter. Cable 10 is inserted and the housings released, causing gripper member 28 to be elongated and narrowed, tightly gripping cable 10 under the urging of spring 40.

In use, an operator can move the gripper device along the cable simply by moving the two housings toward each other, then sliding of the device along the cable to the desired position. An operator need never release his safety belt or harness from the gripping device. Further, the device is absolutely "fail-safe", since it cannot be inadvertently left unlocked. Immediate and positive gripping takes place whenever the device is released. If a worker should fall, the gripper would merely grip more tightly with the person's weight pulling on the housing extension 16. If the worker cannot be raised back to the location from which he fell, he can be safely lowered by merely tapping on the upper end of housing 12. Each tap will permit the gripping device to slide a few inches down cable 10.

While certain preferred materials, arrangements and configurations have been detailed in the above description of preferred embodiments, these may be varied as discussed above where suitable with similar results. For example, gripper member 28 may be varied in composition, number of coils, arrangement of coils, etc. Other applications, variations and ramifications of this invention will occur to those skilled in the art upon reading this disclosure. These are intended to be included within the scope of this invention as defined in the appended claims.

I claim:

1. A fail-safe cable gripping device comprising:
   a first cup-shaped housing having a generally cylindrical wall and a transverse base, said base having a central aperture adapted to having a cable extend therethrough along the axis of said first housing;
   a second cup-shaped housing having a generally cylindrical wall and a transverse base, said base having a central aperture adapted to having a cable extend therethrough along the axis of said second housing;
   the open end of said second housing extending in a telescoping relationship into the open end of said first housing;
   a gripper member comprising at least one strand secured to the inside of the bases of said first and second housings and adapted to coil around a cable extending through said housings;
   a compression spring within said housing bearing against the inside of the bases of said housings to bias the housings apart and tighten said gripper against a cable extending through said housings;
   said first and second housings being adapted to straight-line manual movement toward each other whereby said gripper is released and said device may be moved along a cable extending therethrough, and adapted immediately and automatically to return to the gripping position in response to said spring when said housings are released.

2. The cable gripping device according to claim 1 further including an extension member secured to said second housing and having an eye therein, whereby a personal safety lanyard may be connected thereto.

3. The cable gripping device according to claim 1 wherein said gripper member comprises a plurality of interwoven right-and left-hand coiled strands.

* * * * *